Oct. 22, 1963 M. FIEHL 3,107,912

STACKING DEVICE

Filed Dec. 29, 1960 4 Sheets-Sheet 1

INVENTOR

MICHAEL FIEHL

BY K. P. Johnson

ATTORNEY

Oct. 22, 1963 M. FIEHL 3,107,912

STACKING DEVICE

Filed Dec. 29, 1960 4 Sheets-Sheet 2

Oct. 22, 1963 M. FIEHL 3,107,912
STACKING DEVICE
Filed Dec. 29, 1960 4 Sheets-Sheet 4
FIG. 9
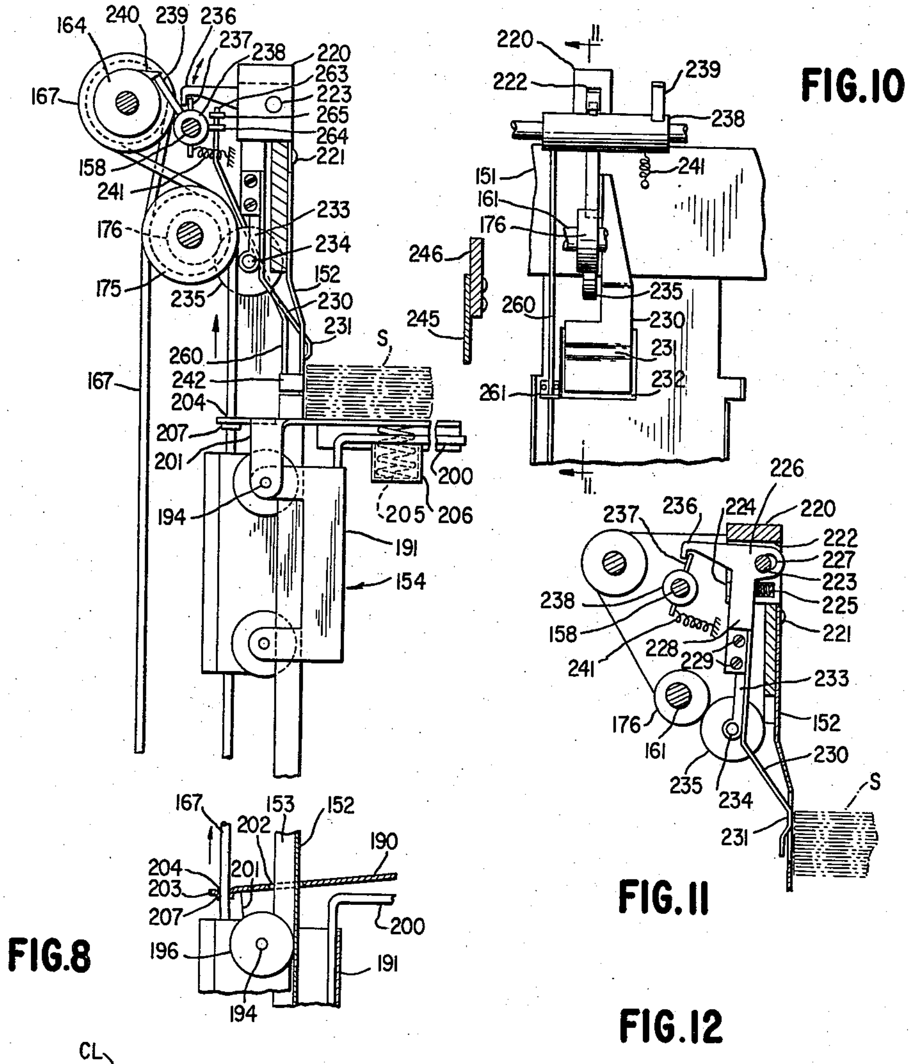
FIG. 9, FIG. 10, FIG. 11, FIG. 8
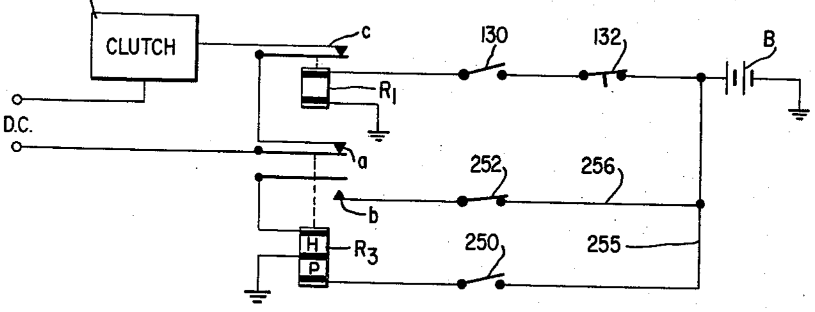
FIG. 12

3,107,912
STACKING DEVICE
Michael Fiehl, East Vestal, N.Y., assignor to International Business Machines Corporation, New York, N.Y., a corporation of New York
Filed Dec. 29, 1960, Ser. No. 79,317
20 Claims. (Cl. 271—88)

This invention relates generally to stacking devices and more particularly to devices for ejecting document stacks formed in positionable self-adjusting document stackers.

In present-day data processing machines, large quantities of documents such as punch cards are required to be repeatedly processed through the machines to obtain the information contained on the cards as needed. The current trend is, therefore, to develop machines which will rapidly process the large number of documents that must be scanned for the information. As the processing speed is increased, one of the difficulties encountered is that of removing the documents from the machine after processing. This is especially evident with regard to machines performing a sorting operation where, for instance, the machine can process documents at the rate of 2,000 per minute.

A machine operator can hope to obtain machine capacity only by maintaining documents in the supply hopper and by removing processed documents from the stacking pocket or stacker enabling constant processing. This necessitates conscientious effort and efficient physical movement by the operator. As a rule of thumb, a person can conveniently grasp 500 to 700 documents as a handful, either for supplying the hopper or emptying the stacker. Thus, if a machine can process 2,000 documents per minute, the operator must place three or four handfuls in the hopper and remove three or four handfuls from the stacker each minute. During this time, he must also choose the proper file trays from which to select the documents and in which to replace the cards. He is further required to control the machine by changing the steps to be performed as processing progresses. In addition to these duties, he may be responsible for operating one or more additional machines. Although machines processing documents at this speed usually have a plurality of stacking pockets into which documents are deposited somewhat evenly according to machine instructions, instances often occur in which a single pocket will receive a definite majority of the documents processed or several pockets will become full nearly simultaneously. Consequently, irregular document removal may be encountered.

The efficiency of both operator and machine can be substantially improved then if the quantity of documents accumulated in the stacker is increased and if the quantity of documents removed from the stacker each time could also be increased. Since a file tray used for storage holds approximately 3,000 documents it is desirable to accumulate this quantity in a stacker before removal, then to transfer the stack quickly and safely by a single operation into a file tray so that a machine operator would spend only the minimum of time in removing documents, avoiding the transfer of documents in handful lots.

However, when stacker capacity is increased from that presently used, document jams occur at the stacker entrance. The support plate for the documents in a stacker pocket, commonly called stacker plate, is resiliently supported to maintain the top of the accumulating stack at a predetermined level. Documents in the stacker are ordinarily confined on three sides to maintain an orderly stack easy to grasp. Thus, as the capacity is increased beyond that presently used, the frictional contact increases between the documents and stacker sides so that the stacker plate does not depress linearly with weight as designed, permitting the top of the stack to rise too far and interfere with incoming documents. Therefore, some positive control of the stacker plate is necessary before increased capacity can be realized.

If the stacking pocket capacity can be increased to hold the equivalent of a file tray of documents, then there must be provided a means of transferring this large quantity of documents quickly and safely to receptacles such as the file tray. The accumulated documents must somehow be removed from the pocket as a stack before placing them into a receptacle. Therefore, a device for transferring a stack of documents out of the stacker pocket to a tray loading position is also necessary.

Although the stacker capacity be increased and a means be available to remove the documents from the stacker, the machine operator may not be immediately free to remove the documents when a stacking pocket becomes full. Machine efficiency would thus be improved when the ejection of a stack is accomplished automatically, permitting the stacker to begin receiving processed documents even though the accumulated stack has not been removed from an ejected position and stored by the operator. This automatic operation would permit an operator wider discretion in distributing his time among his assigned duties, and result in improved machine efficiency by decreasing stop time.

Accordingly, the principal object of the present invention is to provide a device for automatically forming document stacks in a stacking pocket and ejecting those stacks from the pocket.

Another primary object of the present invention is to provide an improved document stacking device.

Other important objects of the present invention are:

To provide an improved device for automatically moving a stacker plate to maintain the level of documents on the stacker plate within predetermined limits;

To provide a stacking device in which the stacker plate is positively adjusted while documents accumulate thereon;

To provide a stacking device in which the stacker plate automatically returns to its initial document receiving position when a stack of documents has been ejected therefrom;

To provide a stacking device in which the deposition of documents therein is interrupted while the stacker plate is returning towards its initial document receiving position when a stack of documents has been removed therefrom;

To provide a device for automatically ejecting a predetermined quantity of documents as a stack from a stacking pocket;

To provide a device for ejecting a document stack from a stacking pocket which transfers the stack to a convenient handling position;

To provide a device for ejecting an increased quantity of documents from a stacking pocket;

To provide a stack eject device which will automatically return to a stack eject position when a prior ejected stack has been removed therefrom;

To provide a device to joggle documents deposited in a stacking pocket to form an orderly stack of documents preparatory for automatic removal and;

To provide a device for joggling documents in a stacker pocket which automatically controls the level of an accumulating stack of documents within predetermined limits.

In accordance with the foregoing objects, this invention provides a stacking pocket having a variable support means on which documents accumulate as they are deposited within the stacking pocket. The support means is moved by an adjusting means within two fixed limits of travel in accordance with the quantity of documents that have accumulated on the support means. The adjustment of the support means is controlled by means operative to actuate a source of rotary power for the adjusting means as determined by the quantity of accumulated documents and thereby maintain the level of documents within predetermined limits. As the variable support means nears its second limit of travel, indicating that a capacity stack of documents has accumulated thereon, a transfer means intercepts the document stack and transfers it to a receptacle means, and at the same time the deposition of documents is interrupted. The receptacle means is mounted on a resiliently supported base assembly responsive to the presence of documents in the receptacle means, and the base assembly carries the transferred stack of documents to an eject position. Upon removal of the document stack from the variable support means, other means cooperate to automatically return the support means to its first limit of travel preparatory to resuming the deposition of documents within the stacking pocket. The ejected stack of documents may then be removed from the receptacle means and the base means returns the emptied receptacle means to a transfer position for receiving another stack of documents.

The invention has several significant features. If the eject receptacle is not unloaded by a machine operator while the receptacle is in its eject position, the feeding of documents is automatically terminated prior to the time that the stacker plate reaches its lower limit or transfer position. A retaining panel is operated as the stack receptacle moves to its eject position to assure that the stack will remain in the receptacle until intentionally removed therefrom. Also, the stack receptacle may be tilted to empty the ejected stack from the receptacle into a suitable container such as a file tray.

Several advantages in handling document stacks are obtained by the present invention. Since the operation of forming and ejecting a stack of documents is automatic, the full time attention of a machine operator is not required. The stacker is essentially self-controlled. Furthermore, because the stacker plate is adjusted according to the level of documents accumulated in the stacking pocket, larger quantities of documents may be stacked in a pocket, and the probability of incoming documents interfering with stacked documents is substantially decreased. The increased quantity of documents handled by an operator permits a more efficient utilization of machine time and the operator's time.

The foregoing and other objects, features and advantages of the invention will be apparent from the following more particular description of the preferred embodiments of the invention, as illustrated in the accompanying drawings.

Figures 2, 3, 3A, 4:
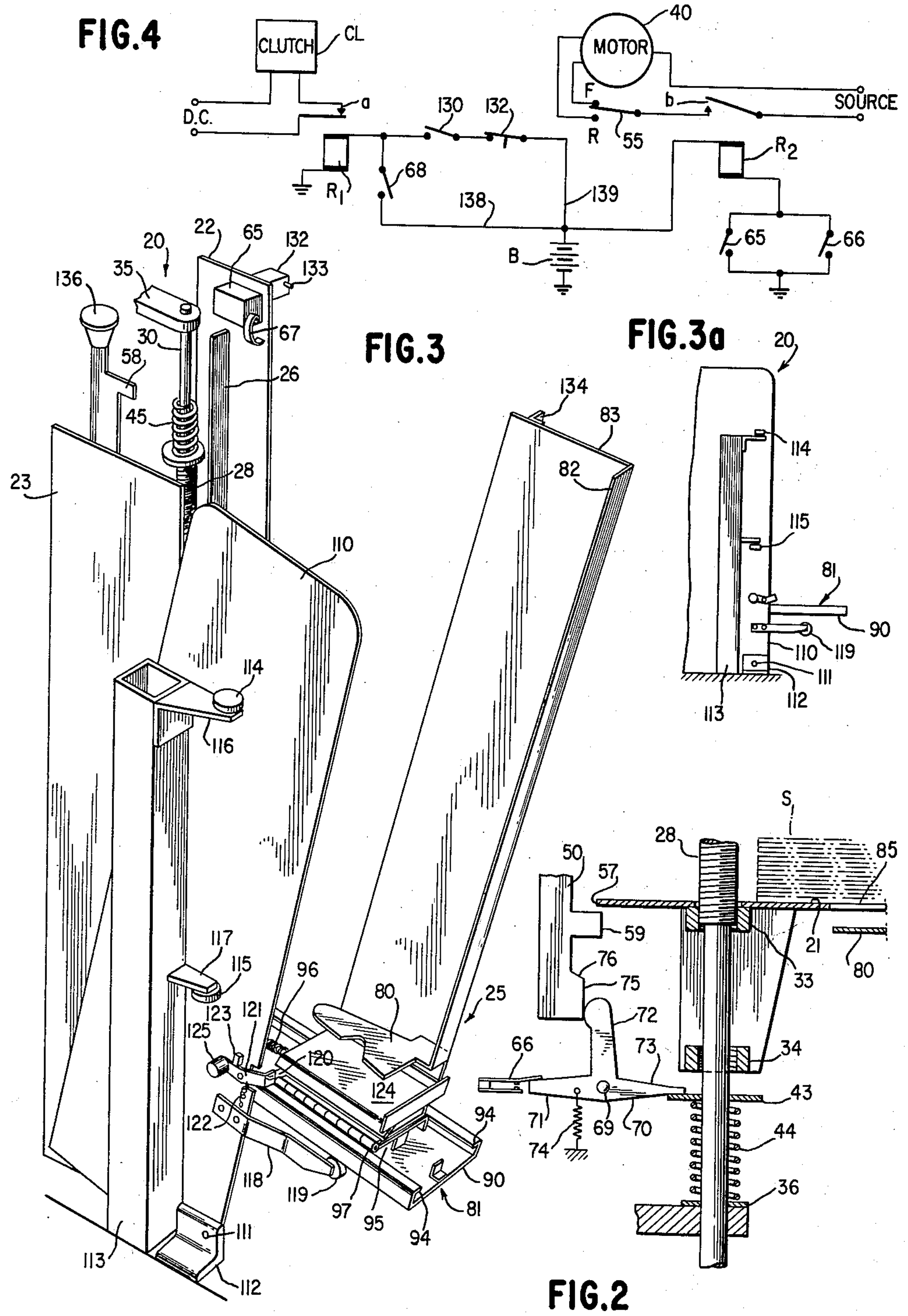
FIGURE 2 is a partial sectional view of the adjustable stacker plate of the device in FIGURE 1, shown near its extreme lower position.
FIGURE 3 is a perspective view of the document stack ejecting mechanism of FIG. 1 shown approaching its eject position.

FIGURE 3*a* is a side elevation view of the base of the ejecting mechanism relative to a stacking pocket.

Figure 1:
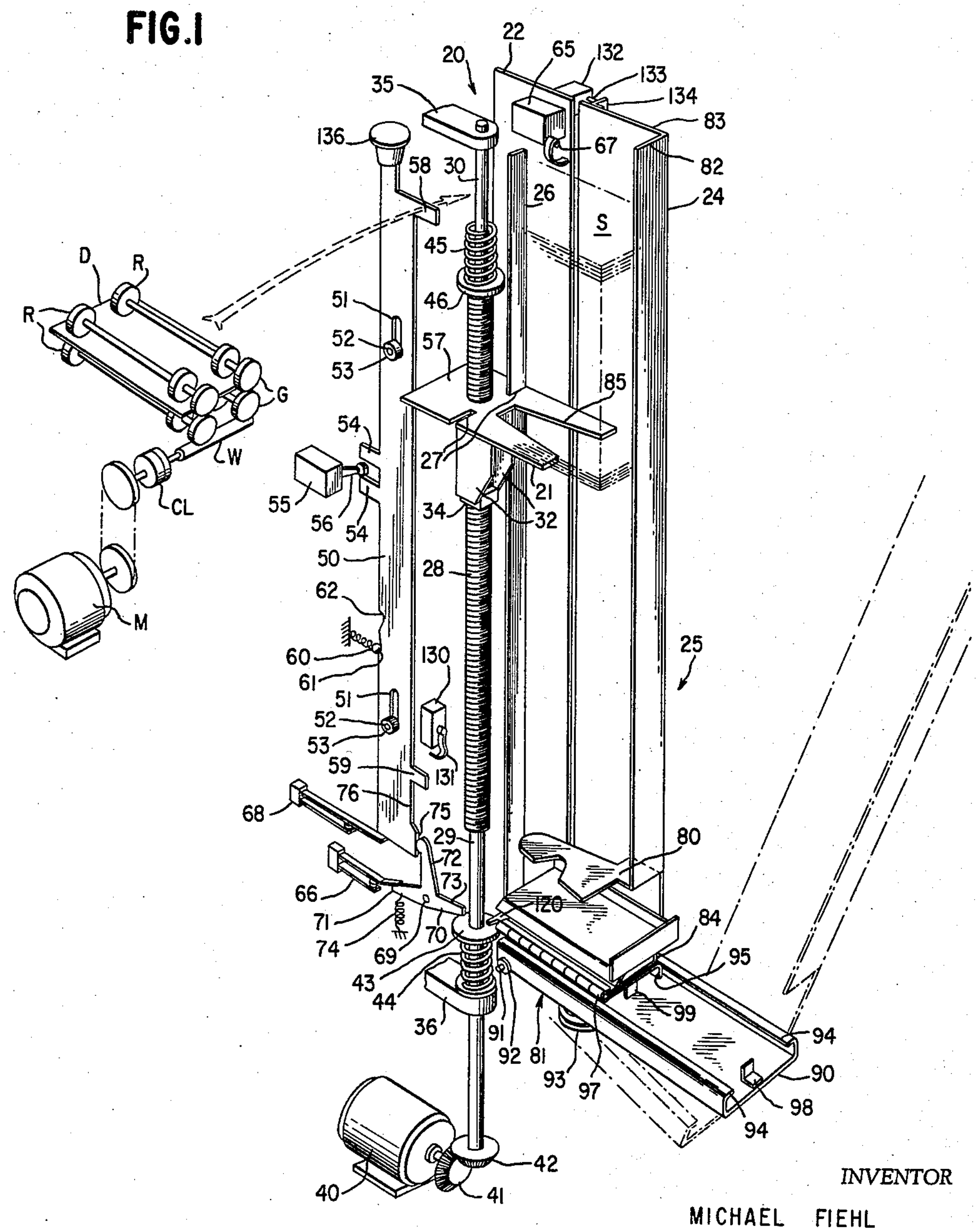
FIGURE 1 is a perspective view of one embodiment of the device for forming and ejecting document stacks with retaining panels removed on one side of a stacking pocket.

FIGURE 4 is a wiring diagram of the electrical circuits for the stack forming and ejecting device in FIG. 1.

Figure 5:
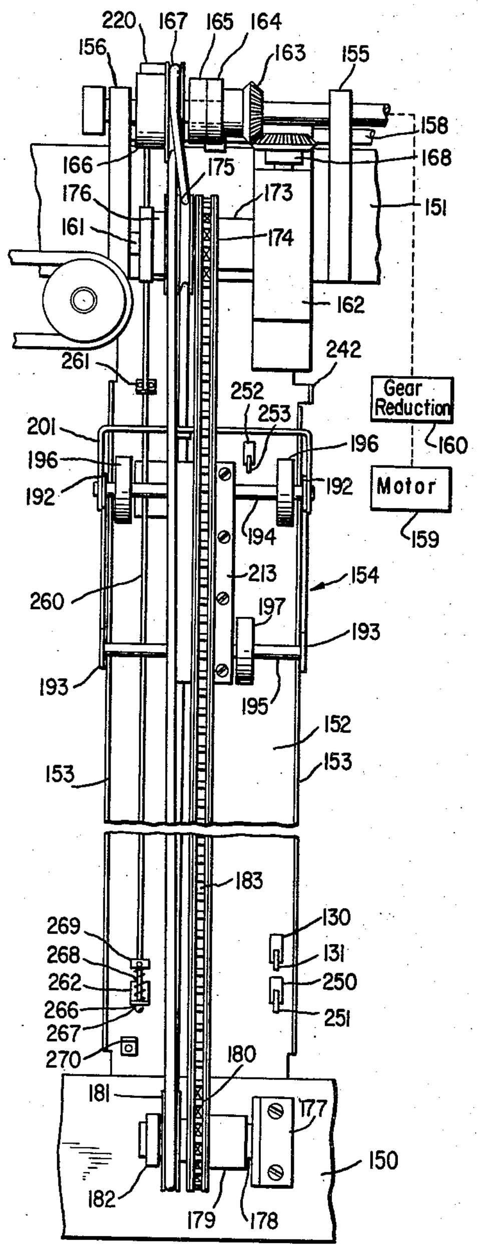

FIGURE 5 is a rear elevation view of an alternate embodiment of a stack forming mechanism operable with the stack eject mechanism shown in FIG. 1.

Figure 6:
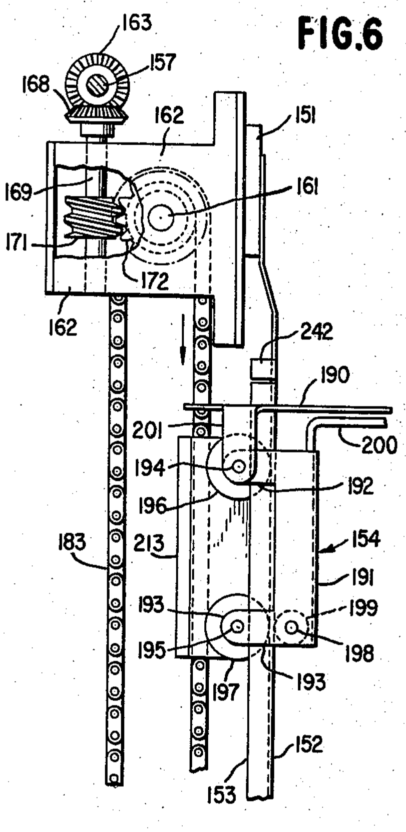

FIGURE 6 is a partial side elevation view of the mechanism shown in FIG. 5.

Figure 7:
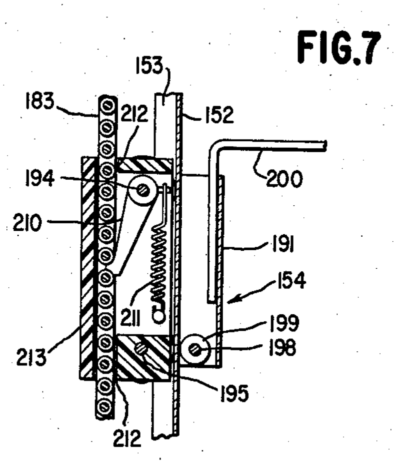

FIGURE 7 is a partial sectional view of the stacker plate undercarriage shown in FIG. 6.

FIGURE 8 is a partial sectional view of the stacker plate of FIG. 5 shown engaged for return to its extreme upper position.

FIGURE 9 is a side elevation view of the document joggling mechanism for controlling the adjustment of the stacker plate of the stack forming mechanism shown in FIG. 5.

FIGURE 10 is a rear elevation view of the document joggling device shown in FIG. 9.

FIGURE 11 is a sectional view taken on the lines 11—11 of FIG. 10.

FIGURE 12 is a wiring diagram of the electrical circuits for the stack forming mechanism shown in FIG. 5.

*General Description*

The first embodiment of the invention is shown in FIGS. 1–4. This embodiment generally comprises a stacking pocket 20 having at the rear of the pocket, a vertically supported worm 28, rotatable in either direction. A movable end plate 21, called a stacker plate, is threadedly attached to the worm 28, guided by strips 26 and can be adjusted vertically in accordance with the amount and direction of rotation of worm 28. Documents D are deposited on stacker plate 21 by feed rolls R and control circuits lower the stacker plate by controlling the rotation of motor 40 as it drives worm 28. Disposed adjacent stacking pocket 20 is a stack receptacle 25 mounted on a resiliently supported base 81. An intercept or transfer plate 80, fixed in stack receptacle 25, is disposed in the path of stacker plate 21 and adapted to pass through a cut-out in the stacker plate. As the stacker plate is lowered by worm 28 through control circuits, transfer plate 80 intercepts the document stack supported on the stacker plate. The transfer plate also serves as the stack rest in the stack receptacle. The weight of documents in stack receptacle 25 then causes resiliently supported base 81 to compress spring 93 and tilt downwardly about pin 91, permitting stack receptacle 25 to slide to the right against stop 98 (see dot-and-dash line position, FIG. 1). Other control circuits cause stacker plate 21 to be returned to its upper position after stack transfer has taken place, and also terminate the deposition of documents within the stacking pocket while the stacker plate is being returned.

*Stacking and Ejecting Device*

Referring now to FIG. 1, aforementioned documents D are schematically illustrated as being deposited by the feed rolls R in a stacking pocket 20, as is well-known in the document processing art. Feed rolls R are close to the pocket entrance and may be operated by any suitable arrangement such as gears G rotated by worm W, which is actuated by a motor M suitably connected through a clutch CL. As successive documents leave the feed rolls, they enter the top of stacker pocket 20, falling on stacker plate 21 to form a document stack. The stacking pocket is formed by parallel side plates 22 and 23 (FIG. 3) secured to a base member, not shown. The L-shaped portion 24 of stack receptacle 25 cooperates with side panel 22 to form the right side of the pocket, and to form a retainer along the front edge of the stack. Strips 26 (only one is shown) are secured to side panels 22 and 23 to dually serve as a rear wall of the pocket and as a guide for stacker plate 21 as it is moved along a vertical path. Stacker plate 21 is guided on strips 26 by notches 27 cut in the stacker plate.

As seen in FIGS. 1 and 2, the stacker plate is adapted to move vertically within the stacker pocket according to the quantity of cards stacked thereon, and is supported for this movement on a worm 28 having unthreaded portions 29 and 30 adjacent each end of the worm. Stacker plate 21 is threadedly attached to worm 28 through a depending carriage assembly comprised of side plates 32 welded to the underside of the stacker plate, and a pair of spaced, internally threaded nuts 33 and 34 (FIG. 2) which threadedly fit worm 28. Thus, since strips 26 permit the stacker plate to move only in a vertical path without rotation and because the side plates 32 and nuts 33 and 34 are rigidly attached to the stacker plate, rotation of the worm will cause the stacker plate to move in either an upward or downward direction, depending on the direction of rotation. The worm is vertically supported for rotation by thrust bearings in support arms 35 and 36. Bi-directional rotation of the worm is accomplished by using a reversible electric motor 40 connected to the worm through appropriate gearing, such as bevel gears 41 and 42.

The travel of stacker plate 21 is limited at each end of the worm by unthreaded portions 29 and 30, mentioned above. Unthreaded portion 29 is equipped with a floating washer 43 and a helical compression spring 44, each being easily slidable along portion 29 between the threaded portion 28 and support arm 36. Unthreaded portion 30 is similarly equipped with a floating washer 46 and a helical compression spring 45, also adapted to slide between the end of the threaded worm portion 28 and support arm 35. As motor 40 rotates worm 28 through the bevel gears 41 and 42 in a forward direction, nuts 33 and 34 will travel downwardly carrying stacker plate 21, and as rotation of the worm is continued, the nuts will successively drop off the threaded portion 28 so that nut 34 will come to rest on floating washer 43 which, in turn, rests upon spring 44. Continued rotation in the forward direction of shaft 28 causes no further lowering of stacker plate 21 with its supporting undercarriage of plates 32 and nuts 33 and 34. Spring 44 is of sufficient strength, however, to constantly urge nut 33 into engagement with threaded portion 28 when there are no documents on the stacker plate. When worm 28 is rotated in a reverse direction by motor 40, nut 33 will engage the threads of the worm and also cause the subsequent engagement of nut 34 with the threads of the worm. Continued reverse rotation of the worm, therefore, carries stacker plate 21 and its supporting assembly of plates 32, nuts 33 and 34 to the upper unthreaded portion 30, where nuts 33 and 34 again become disengaged from threaded portion 28. At the upper limit of travel, stacker plate 21 engages floating washer 46 and causes the floating washer and spring 45 to move upward against support arm 35. However, spring 45 constantly urges nut 34 against the threads on worm 28 for engagement therewith when the worm is rotated in the forward direction. It can be seen that stacker plate 21 can be moved positively between upper and lower limits of travel and automatically engaged and disengaged with the worm at each limit.

The amount and direction of rotation of motor 40 and worm 28 are controlled through the actuation of various switches now to be described. With particular reference to FIGS. 1 and 4, there is shown a slide member 50 having elongated holes 51 therein. Guide pins 52, which may be mounted in the rear edge of side panel 23, extend through holes 51 to define a path of travel for slide member 50. Collars 53 may be fixed to pins 52 to confine slide member 50 against lateral movement. Slide member 50, through its position and by means of rear projections 54, operates motor switch 55 by positioning switch arm 56 in either an upper or lower position. Switch 55 merely conditions the motor 40 for operation in a forward or reverse direction, the motor being conditioned for forward rotation when the switch is in the upper or shown position (see FIG. 4). Slide member 50 is moved between its upper and lower positions by the rear ledge 57 of stacker plate 21 engaging projection 58 or projection 59, depending upon the position of stacker plate 21. For example, when stacker plate 21 is carried to its upper position, ledge 57 will engage projection 58 and move the slide member to the position shown. Conversely, when stacker plate 21 is in its lowermost position, ledge 57 will engage projection 59 and move slide member 50 downward causing reversal of the motor. Any suitable detent, such as ball detent 60, is used to engage notches 61 and 62 to maintain the slide member 50 in the position to which it is moved. Accordingly, the slide member will remain in a set position while stacker plate 21 is at any intermediate location between its two extremes of travel.

The amount of motor rotation is controlled through the operation of switches 65 and 66 connected in parallel. Switch 65, having a rockable arm 67 is used to constantly sense the top of document stack S and intermittently energize motor 40 to cause worm 28 to lower stacker plate 21 as necessary and maintain the top of the document stack within predetermined limits. As documents D are deposited successively atop one another, the level of the stack becomes higher and causes switch arm 67 to rock in a counterclockwise direction and close the contacts of switch 65. In FIG. 4, the closure of switch 65 completes a circuit from ground through switch 65, the coil of relay R2, battery B and return to ground. Thus, relay R2 will be energized and close contacts *b* to complete a circuit from an electrical source through contacts *b*, switch 55, which has been set for forward rotation, motor 40 and return to the source. The rotation of worm 28 produced by motor 40 lowers the stacker plate carrying document stack S away from switch 65 and will permit switch 65 to eventually open the circuit to relay R2, thus stopping motor 40. In this manner, as documents D are deposited in stacker pocket 20, switch arm 67 causes intermittent rotation of motor 40 in a forward direction as long as switch arm 56 remains in the position shown in FIG. 1.

Switch 66, while being connected in parallel with switch 65, is employed to control the rotation of motor 40 when the motor is conditioned by switch 55 for reverse rotation. As the stacker plate reaches unthreaded portion 29 of worm 28, rear ledge 57 engages projection 59 on slide member 50. When nut 33 drops off the threaded portion of worm 28, slide member 50 is moved to its lower position, causing switch 55 to condition the motor for reverse rotation. The downward movement of the slide member does not operate directly to close the contacts of switch 66, but is merely a prerequisite to the operation of the switch. As seen in FIGS. 1 and 2, there is interposed between the slide member and switch a three-armed lever 70 mounted on pivot 69 and having arms 71, 72 and 73. Lever 70 is constantly urged in a counterclockwise direction by spring 74 forcing arm 72 against edge 75 of the slide member. Ordinarily, when the slide member has been moved to its lower position, there would be no restraint to the rotation of lever 70 permitting the contacts of switch 66 to close, since cutout 76 in the slide member is aligned with arm 72 of lever 70. However, when slide member 50 is pushed downward, nut 34 rests on arm 73 preventing rotation of lever 70. The interaction of nut 34 and lever 73 provides an interlock to prevent reverse rotation of motor 40 before document stack S has been removed from stacker plate 21. As long as document stack is sitting on the stacker plate, spring 44 cannot raise the stacker plate and its undercarriage so that lever 70 cannot rotate to close the contacts of switch 66. Upon removal of the document stack from the stacker plate by transfer plate 80, and an eject mechanism to be described, spring 44 can force nut 33 into contact with the bottom of the threads on worm 28. This limited upward movement of the stacker plate and its undercarriage is sufficient to permit lever 70 to rotate and close switch 66.

The closure of switch 66 energizes relay R2, shown in FIG. 4, to complete a circuit for motor 40, which has been conditioned for reverse rotation by the depression of switch arm 56 on switch 55. The relay circuit is from ground, through closed switch 66, the pick coil of relay R2 and battery B to ground. Relay R2, when picked, closes contact points *b* to complete a circuit to motor 40. The motor will continue to operate in a reverse direction engaging worm 28 with nuts 33 and 34 to raise stacker plate 21 toward its upper extreme position. Reverse rotation will continue until ledge 57 on stacker plate 21 engages projection 58 to raise slide member 50. As the slide member is raised, edge 75 will contact arm 72 and rotate arm 70 in a clockwise direction to open switch 66 and break the circuit to relay R2 which permits contact points *b* to open and stop motor 40. At the same time slide member 50 is raised to its upper position; switch arm 56 is also raised to condition motor 40 for forward rotation.

The movement of the slide member also controls the document feeding mechanism by closing or opening switch 68, which controls clutch CL. When ledge 57 moves the slide member downward, switch 68 is closed so that it completes a circuit to relay R1 (FIG. 4) to break the circuit to electromagnetic clutch CL. This circuit is from ground through battery B, line 138, switch 68, the pick coil of relay R1 and back to ground. Energized relay R1 opens contact points *a* to break the circuit from an electrical source to clutch CL and, thus stop the deposition of documents D in the stacking pocket. The document feeding mechanism will remain stopped until slide member 50 has been returned to its upper position by ledge 57 on stacker plate 21. At that time, switch 68 will be opened so that relay R1 is no longer energized, thus permitting contact points *a* to close. Documents will then begin to accumulate again on stacker plate 21 to form a stack.

The mechanism for removal of a completed stack of documents from stacker plate 21 to an eject position will now be described. The stack ejection is accomplished generally through the cooperation of receptacle 25, transfer member 80, a movable base means, indicated generally as 81, and stacker plate 21 in stacking pocket 20. Receptacle 25 is formed of side panels 82 and 83 joined at right angles to one another and extending approximately the full length of the stacking pocket or at least the length of travel of stacker plate 21. Panel 83 cooperates with side panel 22 to form one side of stacking pocket 20 when in the position shown. Panel 82, in effect, operates as a front retainer for pocket 20 when in the position shown in FIGURE 1 and as a stack support when a document stack is ejected. A base 84, which may be formed from an extension of side panel 83, serves as a support for the stack receptacle. Transfer plate 80 is attached to side panels 82 and 83 to extend horizontally beyond the left edge (FIGURE 1) of the panel 83 into the path of stacker plate 21. The stacker plate has a U or V-shaped cut-out 85, however, so that, as the stacker plate is moved downwardly, transfer plate 80 will pass through the cut-out 85 and intercept the document stack resting on the stacker plate. It is to be noted that the stacker plate does not extend forward to panel 82, but is short enough to permit transfer plate 80 to be secured to both panels 82 and 83. Transfer plate 80 is formed in a complementary configuration to that of stacker plate 21. Transfer plate 80 is located (FIG. 2) immediately below the lowest thread of worm 28. The reason for this will be discussed below when the stack transfer is described.

The base means 81 for receptacle 25 will be described with reference to FIGS. 1, 3 and 3*a*. A C-shaped member 90 is pivoted for movement about pin 91 suitably secured, for instance, in side walls 22 and 23, above the bottom of panels 22 and 23, with members 90 axially positioned thereon by means of collars 92. FIG. 3*a* shows the vertical position of member 90 relative to the side panels of stacking pocket 20. Member 90 is urged in a counterclockwise direction about pin 91 by spring 93, and has a pair of inwardly turned flanges 94. Slidably disposed within member 90 is an inverted U-shaped channel 95, the edges of which extend under flanges 94. Channel 95 is constantly urged to the left by spring 96, seen in FIG. 2, secured to member 90 and channel 95. Receptacle support 84 is secured to inverted channel member 95 through hinge 97.

When there is no document stack in stack receptacle 25, springs 93 and 96 are sufficient to move member 90 to a horizontal position and channel 95 to the left, respectively, as shown in FIGURE 1. These springs however, are sufficiently weak, so that when the stack receptacle contains a stack of documents, they are overcome to permit member 90 to tilt downwardly in a clockwise direction, causing spring 96 to be overcome to thereby permit channel 95 to move outwardly and down tilted member 90 to an eject position, indicated by phantom lines in FIG. 1. The outward partial movement of channel 95 is illustrated in FIGURE 3. Stop brackets 98 and 99 are provided to coact with each other and limit the outward travel of channel 95.

When the stack receptacle moves outwardly toward the eject position, there may be a tendency for the documents resting on transfer member 80 in receptacle 25 to fall out the open side of the receptacle before removal of the stack. Therefore, a movable auxiliary panel 110 is provided (FIG. 3) to serve as a retainer for the ejected stack. Panel 110 is pivotally mounted on pin 111 secured in base element 112. The auxiliary panel normally remains in a vertical position adjacent and parallel with side panel 23. An upright support 113 having rollers 114 and 115 mounted thereon by arms 116 and 117, respectively, holds the auxiliary panel against side panel 23 and guides the auxiliary panel when it is tilted outwardly.

The auxiliary retaining panel moves outwardly automatically with the stack receptacle as the latter moves to its eject position. When a document stack is transferred to the stack receptacle, member 90 tilts downwardly as above described. Arm 118, fixed to auxiliary panel 110, supports roller 119 under and adjacent channel member 90. As member 90 rotates downwardly, it engages roller 119 and pivots panel 110 outwardly. However, member 90 does not tilt downwardly a sufficient amount to keep panel 110 adjacent the transferred stack because receptacle 25 on channel member 95 slides outwardly and a contained stack of documents would move beyond the retaining effect of the panel. Therefore, pawl 120, fixed to the rear edge on base 84 of panel 83, is provided to engage pivoted latch 121 on auxiliary panel 110. The latch is urged in a clockwise direction by spring 122 against a stop block 123. When channel 95 slides outwardly, latch 120 engages pawl 121 to pull auxiliary panel 110 farther in a clockwise direction and maintain the auxiliary panel adjacent the document stack in receptacle 25. Roller 119 thereupon moves downwardly away from member 90.

An ejected stack may be removed from receptacle 25 and directly deposited in a file tray. The file tray capacity is that of a full stack of documents in receptacle 25. In order to deposit the stack in a file tray, the tray may be placed on end on surface 124 facing the document stack. However, prior to this, auxiliary panel 110 must first be released by depressing knob 125 to let the auxiliary panel fall backwardly until roller 119 contacts channel member 90. This action exposes the document stack in receptacle 25. The file tray is then placed on surface 124 and the receptacle tilted on hinge 97 to empty the documents into the file tray. After receptacle 25 is returned to rest on channel 95 and the filled file tray removed, spring 93 urges member 90 upwardly to a horizontal position and channel 95 is urged inwardly towards the stacker pocket by spring 96. Pawl 120 slides rearwardly under latch 121 because block 123 holds the latch sufficiently clear of the pawl when panel 110 is upright and channel member 90 is in a horizontal position.

The actual transfer of documents from stacker plate 21 to transfer plate 80 will be described with reference to FIGS. 1 and 2. It will be recalled that, as rollers R deposite individual documents D in the stacking pocket, arm 67 of switch 65 constantly senses the level of documents accumulated on stacker plate 21. Switch 65, when its contacts are closed, completes a circuit to motor 40, which is conditioned for rotation in a forward direction to thus rotate worm 28 and lower stacker plate 21 as necessary. The intermittent lowering of stacker plate 21, controlled by switch 65, eventually carries the stacker plate to the lowermost threads of worm 28, as seen in FIG. 2. As documents continue to accumulate, worm 28 will lower stacker plate 21 until nut 33 drops off the end of the worm. Since stacker plate 21 is no longer supported by the worm, the weight of the document stack S forces the stacker plate downwardly carrying nut 34 against floating washer 43 and against end 73 of lever 70, and at the same time, permitting transfer plate 80 to pass through cut-out 85 in stacker plate 21. Therefore, as the stacker plate begins to fall freely, transfer plate 80 intercepts the stack of documents S, removing the weight of the document stack from stacker plate 21. Although the weight of the document stack is primarily on transfer plate 80, the stack also prevents spring 44 from pushing nut 33 upwardly into engagement with the lowermost thread of worm 28. It will be remembered that when nut 33 dropped off the lowermost thread on worm 28, rear ledge 57 of the stacker plate also moved slide member 50 downwardly, bringing cut-out 76 into alignment with arm 72 to permit lever 70 to rotate in a counterclockwise direction and close the contacts of switch 66. However, the motor cannot be energized because the weight of document stack S maintains nut 33 below the lowermost thread on the worm 28 and nut 34 restrains any rotation of lever 70.

As soon as the document stack has been deposited on transfer member 80, the weight of the stack in receptacle 25 is sufficient to overcome spring 93, thereby permitting member 90 to rotate downwardly and begin to carry stack S away from stacker plate 21. This motion causes stack S to move arcuately over the outer ends of stacker plate 21 and maintain nut 33 out of engagement with the lowermost threads of worm 28 and also restrict lever 70 in its clockwise position to keep the contacts of switch 66 open. When channel member 90 has tilted downwardly to its limit, channel 95 then begins to slide outwardly carrying receptacle 25 and the contained stack of documents. As soon as the document stack clears the ends of stacker plate 21, spring 44 urges washer 43 and nuts 33 and 34 upwardly, bringing nut 33 into engagement with the lowermost thread of worm 28 and permitting lever 70 to move sufficiently in a counterclockwise direction so that arm 71 no longer maintains switch 66 in an open position. Thus, since slide member 50 is in its lower position, the motor 40 is conditioned for reverse rotation and switch 66 completes the circuit to the motor. The motor continues to operate in a reverse direction until stacker plate 21 rises to its upper limit, where rear ledge 57 engages projection 58 on the slide member 50 to move the slide member to its upper position, causing edge 75 to engage arm 72 of lever 70 and again open the contacts of switch 66 to thereby open the circuit to motor 40. When slide member 50 is raised to its upper position, the contacts of switch 68 are permitted to close and cause resumption of the document feeding operation to repeat the process.

As seen from the above description, when stacker plate 21 is returned to its upper limit, the deposition of documents is automatically resumed. Furthermore, as the stack accumulates the stacker plate will be lowered towards its lowermost position. In the meantime, a machine operator may not have removed an ejected stack of documents from the receptacle and, for that condition, there is provided a safeguard to halt the feeding of documents into the stacker until receptacle 25 and transfer plate 80 have returned to the stack-receiving position. This safeguard is an interlock circuit comprised of switches 130 and 132, which, when closed together, provide a completed circuit for a relay to break the circuit and disable clutch CL.

As shown in FIGS. 1 and 4, switch 130, having arm 131, is normally open and is located a short distance above the end of threads on worm 28. As stacker plate 21 progresses downwardly on worm 28, rear ledge 57 rocks switch arm 131, thereby closing the contacts of the switch. This will occur every cycle of travel of stacker plate 21. The closure of switch 130 only partially completes a circuit to relay R1 controlling clutch CL, since switch 132 is in series with switch 130. Switch 132 is normally closed and is located on side panel 22 adjacent panel 83 of stack receptacle 25. Plunger 133 of switch 132 is normally held inwardly by a stop 134 secured to panel 83. If panel 83 is moved outwardly from panel 22, plunger 133 is forced outwardly by a spring (not shown) in switch 132 to thereby close the switch contacts. A circuit will then be completed from ground through battery B, line 139, switch 132, switch 130, the pick coil of relay R1, back to ground, to energize relay R1 and open contact points *a* in the clutch circuit to terminate document feeding. Therefore, since no more documents are fed onto the top of stack S, switch 65 will no longer energize motor 40 lower stacker plate 21. As soon as the previous stack of documents has been removed by an operator, receptacle 25 assumes its stack transfer position to open the contacts of switch 132 and break the relay circuit and allow contact points *a* to close and complete the clutch circuit. Thus, document stacking will be terminated if the eject receptacle is not properly positioned and will be started again as soon as the eject receptacle is restored.

In the document stacking operation, a special situation develops when a partial stack of documents is removed from the stacking pocket. This may occur at the completion of processing of a particular group of cards where a stacking pocket may contain only a partial stack, or the machine operator may desire to remove a partial stack of cards without waiting for the stacking pocket to become full. In this embodiment, when a partial stack of documents is removed from the stacking plate 21, it will be recalled that slide member 50 is in its upper position so that, as the contacts of switch 65 are closed, motor 40 will rotate worm 28 in a forward direction to lower the stacker plate. The removal of a partial stack of documents from the stacker plate, leaving the stacker plate in an intermediate position between its two extremes of travel, may result in leaving stacker plate 21 or the top of the remaining documents at too great a distance from the height at which cards enter the stacking pocket and causing the cards to come to rest on the stacker plate in a disorderly array. This possibility is avoided by providing knob 136 on slide member 50, which the machine operator may grasp to manually depress the slide member to its lower position, thus conditioning motor 40 for reverse rotation and permitting lever 70 to rotate in a counterclockwise direction, closing contacts of switch 66. The contacts of switch 68 will also be closed to insure that no documents are deposited within the stacking pocket until stacker plate 21 has returned to its upper position. Thus, with motor 40 conditioned for reverse rotation and contacts of switch 66 closed, a circuit is completed which will cause motor 40 to rotate worm 28 in reverse direction and return stacker plate 21 and its undercarriage to the extreme upper position on unthreaded portion 30. The return of stacker plate 21 to this position will automatically raise slide member 50 to its upper position and, thus, condition the control circuits for the receipt of documents in the stacking pocket, as described heretofore.

*Alternative Stacking Device*

An alternative embodiment of mechanism for operating, adjusting and controlling the location of the stacker plate in the stacking pocket is illustrated in FIGS. 5 through 12. This embodiment eliminates the necessity for an electrically operated clutch to adjust the location of the stacker plate and incorporates a return device for the stacker plate from any position throughout the length of the stacker pocket. When the stacker plate is to be lowered, a worm is intermittently energized through a mechanically operated clutch, and the stacker plate may be raised by engaging the plate with a continuously operating endless member engageable at any point in the stacker. Although this embodiment differs from the prior one in achieving stack formation, the structure for ejecting a formal stack is the same for both embodiments and will not be redescribed.

Referring now to FIGS. 5, 6, and 7, there is illustrated a lower frame member 150 and an upper frame member 151, between which is secured plate 152, forming the rear wall of the stacking pocket. Plate 152 has rearwardly extending flanges 153 running partially along each edge to essentially form a guide track for undercarriage 154 of the stacker plate. Undercarriage 154 moves in a vertical path within the limits of the flanges and carries thereon the stacker plate to be described hereinafter. Secured to the rear of support member 151 is a pair of support plates 155 and 156 in which shafts 157 and 158 are journaled for rotation. Shaft 157 is continuously operated by motor 159 through gear or belt reduction 160. The operation of shaft 158 will be described below. Also journaled in plate 156 is shaft 161 extending to the right into gear box 162, which is mounted on frame member 151. Shaft 157 has mounted thereon, for free rotation relative to the shaft, bevel gear 163 having its hub secured to one plate of a friction clutch 164. Secured to the shaft for rotation therewith is the remaining plate 165 of the friction clutch. Also secured to shaft 157 is pulley 166, which operates as a drive pulley for endless flexible belt 167 shown thereon.

Meshed with bevel gear 163 is bevel gear 168 mounted on shaft 169 as shown in FIG. 6 in worm gear box 162. Shaft 169 is free to rotate in the housing of gear box 162 and has fixed thereon worm 171 in engagement with gear 172, gear 172 being fixed to shaft 161 to rotate the shaft. As best shown in FIGURE 5, shaft 161 also has fixed thereon hub 173 of sprocket 174. To the left of sprocket 174 and mounted for free rotation on shaft 161 is a double idler pulley 175, for belt 167, and cam 176 attached to the idler pulley 175; the cam and pulley will thus rotate freely on shaft 161 at the speed at which pulley 175 is driven by pulley 166 through belt 167.

Referring now to the bottom of FIGURE 5, a bracket 177 is fixed to frame member 150 and secured in the bracket is shaft 178 having mounted thereon spacer 179, freely rotatable sprocket 180, freely rotatable pulley 181, and collar 182 fixed to the shaft. It is to be noted that sprocket 180 and pulley 181 may rotate independently of each other. Endless member 183, for example, a roller chain, is mounted between sprockets 174 and 180 for rotation thereabout. Belt 167, preferably having a circular cross section is mounted on pulley 166, double groove pulley 175 and lower pulley 181, and is crossed as shown in FIG. 9 to move in the direction of the arrow.

The manner in which the chain and belt are driven will be briefly discussed. It will be remembered that shaft 157 is constantly rotating and has clutch plate 165 secured thereto with clutch plate 164 in frictional engagement therewith. Thus, clutch plate 164 may be held, for instance, by a pawl, or permitted to rotate freely with clutch plate 165. Since bevel gear 163 is secured to clutch plate 164 and if rotation is permitted, bevel gear 163 will drive bevel gear 168, thus rotating worm 171 engaged with spur gear 172 which in turn rotates sprocket 174 driving chain 183 on freely rotatable sprocket 180. The rotation of shaft 157 is selected so that chain 183 rotates in a clockwise direction, as shown in FIGURE 6, or so that the right-hand side of the chain in that figure moves downwardly. Thus, the chain will continue to move as long as clutch plate 164 is unrestrained. Chain 183 is used to intermittently lower the document stacker plate, as will later be described. As to belt 167, it will be recalled that pulley 166 is secured to continuously running shaft 157 and, therefore, serves as a drive for belt 167. Belt 167 is threaded around idler pulleys 175 and 181 in a manner shown in FIG. 9 to provide a flexible member constantly moving in a direction opposite to that of the chain. The belt is used to return the document stacker plate from any position below an upper limit of travel, as will be described hereinafter.

Stacker plate 190 (FIG. 6) is supported for movement by an undercarriage, indicated generally as 154. The undercarriage is comprised of a U-shaped body portion having a surface 191 in the stacking pocket proper with rearwardly extending ear portions 192 and 193 straddling rear panel 152 of the stacking pocket. As seen in the figure, shaft 194 interconnects ears 192 and shaft 195 interconnects ears 193 of the U-shaped member 191. A pair of rollers 196 is mounted on shaft 194, the rollers being free to rotate on the shaft and held positioned on the shaft by any suitable means, such as pins or collars. A single roller 197 is mounted on the lower shaft 195, also free to rotate on its shaft and suitably located along the shaft. Mounted between ears 193 on the front side of panel 152 (right side, FIG. 6) is another shaft 198 also having a pair of freely rotatable rollers 199 spaced thereon. An L-shaped bracket 200 is secured to the inside surface of body member 191 and extends upwardly and to the right to aid in supporting stacker plate 190. Thus, undercarriage 154 can be easily rolled up and down the channel formed by flanges 153 on panel 152.

Stacker plate 190 is pivotally mounted on undercarriage 154 by means of a pair of downwardly bent ears 201, which are attached to shaft 194. The stacker plate has the U or V-shaped cut-out similar to that cut-out 85 shown for stacker plate 21 in the first embodiment in FIG. 1. Stacker plate 190 has cut-out 202 (FIG. 8) sufficient to straddle panel 152 and its flanges 153 and permit limited rotation of the stacker plate about shaft 194 of the undercarriage. The stacker plate has a rearwardly extending portion 203 having a slot 204 with a slotted collar 207 aligned therewith, each having an opening slightly larger than the diameter of belt 167 through which the belt passes. Stacker plate 190 is pivotally urged away from L-shaped bracket 200 by means of a compression spring 205 (FIG. 9) supported in a cup-like member 206 depending from L-shaped bracket 200. When there are no cards on stacker plate 190, compression spring 205 is sufficient to rotate the stacker plate upwardly away from L-shaped bracket 200, the reason for this appearing below.

Referring again to FIGS. 5, 6 and 7, undercarriage 154, with stacker plate 190 mounted thereon, is resiliently connected to chain 183 for movement therewith by a pawl 210 rotatably mounted on shaft 194 and urged into engagement with the chain by means of spring 211. As best seen in FIG. 7, a boxlike structure mounted on shafts 194 and 195 has slots 212 in the upper and lower walls thereof through which chain 183 passes and is covered by a wall 213 secured by screws to the walls of the boxlike structure. Wall 213 serves as a stable support for chain 183 as a pawl 210 is urged against the chain. It will be noted from FIG. 7 that the undercarriage 154 is prevented from moving downward relative to the chain by the engagement of pawl 210 with the links of chain 183. However, undercarriage 154 may be freely moved upward relative to the chain, since pawl 210 is free to ratchet on the individual links of the chain. Therefore, undercarriage 154 carrying stacker plate 190 will move downwardly only when the chain is moved by permitting clutch plate 164 to rotate with its mating clutch plate 165.

As shown and described for the first embodiment of the invention, documents D are deposited on stacker plate 190 and as the documents accumulate thereon in the form of a stack S the stacker plate must be lowered intermittently to accumulate additional documents. From the above description, the lowering of stacker plate 190 is accomplished by the release of clutch pressure plate 164 of the friction clutch comprised of plates 165 and 164. The release of clutch plate 164 is accomplished by two controls, either by an arm 230 constantly sensing the level of documents in stack S, or by a transfer control rod 260.

The first control mechanism for clutch pressure plate 164, the level sensing and joggling arm 230, is shown in FIGS. 9, 10 and 11. This mechanism also serves an additional function of joggling the documents endwise as they enter the stacking pocket; the joggling slightly agitates the documents to permit them to settle more evenly and to align them along the outside edge adjacent the eject receptacle. Longitudinal alignment is desirable for eventual transfer into a file tray which is usually only slightly wider than the length of individual documents.

Referring now to the figures, there is shown an inverted U-shaped block 220 having a shaft 223 extending between the sides of the block. Recesses 224 are cut in the depending sides of the block below shaft 223, and a compression spring 225 is mounted therein. Pivotally mounted on shaft 223 is an L-shaped lever 226 having an elongated hole 227 at the pivot point. Depending end 228 of lever 226 has attached thereto by means of screws 229, a joggling arm 230 to form in effect a bell-crank. The joggling arm is deformed to the right, FIGS. 9 and 11, and has a document patting portion 231 which normally extends into the stacking pocket through hole 232 cut in the back wall 152 of the stacking pocket. Mounted on flange 233 of joggling arm 230 is a shaft 234 on which is mounted free running wheel 235. Since L-shaped lever 226, and, hence, joggling arm 230 are pivoted on shaft 223, spring 225 urges wheel 235 against cam 176 attached to pulley 175 and freely rotatable with the pulley on shaft 161 (FIG. 5). It will be recalled that pulley 175 with cam 176 attached thereto is driven constantly by pulley 166 and belt 167. Normally, with no restriction on the document patting portion 231 of joggler 230, spring 225 forces L-shaped lever 226 toward the left in FIG. 11 so that the lever pivots about the rear of elongated hole 227. As cam 176 rotates against wheel 235, joggling lever 230 oscillates into and out of the stacking pocket and end 236 of lever 226 oscillates as shown by the double arrow in FIG. 9. The oscillation of the end 236, however, does not clear projection 237. In FIG. 9, it will be seen that as documents D enter the stacking pocket one end of the documents will be patted by portion 231 of joggling lever 230 and force the document against a plate 245 to successively align each document on the right end. Plate 245 extends downwardly from a frame member 246 only sufficiently to align incoming documents and not interefere with stack removal. The documents then fall to the top of the accumulated stack S; however, when the top of document stack S builds up to the point at which portion 231 of joggler 230 engages a plurality of documents simultaneously, the inertia of the stack is sufficient to prevent joggler 230 from operating.

When joggling lever portion 231 is restricted in its movement, the point of contact between joggling member 230 and stack S then becomes a fulcrum causing lever 226 to move to the right (FIG. 11) in elongated hole 227 on shaft 223 compressing spring 225. As this occurs, hook-end 236 of lever 226 reciprocates horizontally instead of continuing its vertical oscillations, and as it moves to the right in FIG. 11 it contacts projection 237 on bushing 238 which is freely rotatable on shaft 158. The resulting clockwise rotation of bushing 238 causes a second projection 239, fixed to bushing 238, to also move in a clockwise direction disengaging stop pawl 240 on clutch pressure plate 164. This releases the friction clutch so that bevel gear 163 (FIG. 5) is free to rotate with shaft 157 and, in turn rotate mating bevel gear 168 to turn sprocket 174 causing chain 183 to move in the direction of the arrow indicated in FIG. 6. Thus, stacker plate 190 and undercarriage 154 will be lowered. As soon as stacker plate 190, having stack S thereon, has been sufficiently lowered to carry the top of the stack out of contact with the projection 231 of joggler 230, spring 225 (FIG. 11) forces lever 226 to the left permitting projection 239 to engage pawl 240 on clutch pressure disc 164 because of the tension of spring 241. This action thus prevents bevel gear 163 from rotating and stacker plate 190 is prevented from moving lower in the stacking pocket. Spring 241 attached to bushing 238 and a fixed member (not shown) constantly urges bushing 238 in a clockwise direction and projection 239 into engagement with pawl 240. Thus, joggler 230 constantly taps the deposited documents and simultaneously senses the level of the stack on stacker plate 190 to thereby control the adjustment of the stacker plate in accordance with the number of accumulated documents thereon.

The second control mechanism for releasing clutch plate 164 is a transfer control rod 260 shown in FIGS. 5, 9, and 10. This control rod may be moved downwardly to release friction clutch plate 164 and override the control of joggler 230. Rod 260 is supported for vertical movement in holes in a pair of aligned brackets 261 and 262 secured to the rear of pocket wall 152 by screws. A threaded upper end 263 of the control rod extends through a loose fitting hole in arm 264 fixed to bushing 238 and is held so located by a pair of lock nuts 265. The lower end 266 of the control rod extends below the lower bracket 262 and has a horizontal portion 267 which extends into the path of travel of shaft 195 of undecarriage 154. Control rod 260 is spring biased upward by compression spring 268 acting between bracket 262 and collar 269 on the control rod. Spring 268 normally holds the horizontal portion 267 of the rod against the bottom of bracket 262 to prevent inadvertent rotation of bushing 238. The bottom of bracket 262 is vertically located so that the horizontal portion 267 will be engaged by shaft 195 just prior to the time stacker plate 190 reaches the point at which the accumulated document stack is transferred to eject receptacle 25 by transfer plate 80 in FIG. 1.

As stacker plate 190 is intermittently lowered by the operation of joggler 230, shaft 195 will engage horizontal rod portion 267, pulling rod 260 downward against the action of spring 268. Upper end 263 of the rod will engage arm 264 and rotate bushing 238 clockwise in FIG. 9 to release clutch plate 164, overriding the action of joggling arm 230 and causing chain 183 to rotate and lower stacker plate 190. Since the vertical position of transfer plate 80 is fixed and will intercept the document stack, stacker plate 190 need be lowered only until its upper surface moves below the transfer plate. Therefore, a positive stop 270 for undercarriage 154 is provided on rear wall 152 at the lower limit of movement of the control rod to stop the downward travel of the stacker plate. As shaft 195 engages stop 270, pawl 210 (FIG. 7) will ratchet against moving chain 183 until the document stack is removed from the stacker plate by the above described eject mechanism and the undercarriage moves upward to release control rod 260.

There is provided for this embodiment, as for the first embodiment, a circuit which is energized just prior to the point of stack transfer to interrupt the document feeding mechanism and terminate the deposition of documents in the stacking pocket. Once the circuit is energized, it will remain in that condition until stacker plate 190 is returned to its upper limit of travel and ready to receive additional documents to form a new stack. Referring to FIGURES 5 and 12, as shaft 195 is intermittently lowered by the operation of joggling arm 230, the shaft will simultaneously contact control rod 260 and operate arm 251 to close the contacts of switch 250. When switch 250 is closed, a circuit is completed from ground through battery B, line 255, switch 250, and the pick coil of relay R3 to ground and energize relay R3. When relay R3 is activated, it will open contacts *a* and break the circuit to clutch CL of the feeding mechanism to stop document feeding; at the same time, relay R3 will close contacts *b* in the hold circuit of the relay to complete a circuit from ground, battery B, line 256, switch 252, contacts *b* and the hold coil of relay R3 to ground. The relay will remain in an operated condition until switch 252 is opened. Switch 252 is located on rear wall 152 and is normally closed. However, when undercarriage 154 is returned to its upper extreme of travel, shaft 194 rocks arm 253 of switch 252 to momentarily open switch 252 and deenergize the hold coil of relay R3. Switch 250, being normally open, will have opened as soon as undercarriage 154 started to move upward.

In this embodiment, the return of stacker plate 190 from its extreme lower position to its extreme upper position is automatic either when a full document stack has been removed or when a partial document stack has been removed. The manner in which this automatic return is accomplished will be described with reference to FIGS. 1, 8 and 9. When the stacker plate and its undercarriage are in the extreme upper position, documents are deposited on the stacker plate in the form of a stack and the weight of a few of these documents overcomes spring 205 and forces stacker plate 190 to assume a horizontal position, as shown in FIG. 9. The stacker plate and its undercarriage will be carried downwardly by the action of chain 183 until the document stack comes to rest on transfer plate 80 of the eject receptacle. The presence of documents on transfer plate 80 causes eject receptacle 25 to move outwardly to its eject position, thus removing the documents from the stacker plate. This action permits spring 205 to rotate stacker plate 190 about shaft 194 on which it is pivoted, causing the stacker plate to contort and frictionally grip continuously running belt 167 by means of slot 204 and slotted collar 207 on the underside of rear portion 203 of the stacker plate. The frictional engagement is sufficient to transport undercarriage 154 and stacker plate 190 to their extreme upper positions. Disengagement of the stacker plate from belt 167 occurs when the upper surface of stacker plate 190 comes into contact with ear 242, which forces stacker plate 190 to rotate in a clockwise direction and assume a nearly horizontal position. Ear 242, illustrated in FIGS. 5 and 9, is shown attached to rear panel 152 but extending outward farther than flanges 153 of the rear panel. During the return of stacker plate 190, pawl 210 (FIG. 7) ratchets against the links of chain 183 and the action of spring 211 as it traverses the return path. As the stacker plate becomes disengaged from belt 167, pawl 210 prevents the stacker plate and its undercarriage from dropping because of immediate engagement with one of the chain links. As the deposition of documents on the stacker plate is resumed by the temporary opening of switch 252, described above, the accumulating stack depresses the stacker plate to a horizontal position. Thus, the stacker plate is again lowered under the control of jogging arm 230. When a partial stack of documents is removed from the stacker plate in this embodiment, the stacker plate will automatically return from any intermediate position to the extreme upper position ready to resume stacking operation because spring 205 is sensitive to the absence of documents on the stacker plate and will rotate the stacker plate about its support 194 to frictionally engage continuously running belt 167.

As already described for the first embodiment, there is provided an interlock circuit to ensure that the stacker plate, bearing stack S, does not reach the transfer position in the event that the stack receptacle 25 (FIGS. 1 and 3) is not in position to receive the newly-formed document stack. The interlock circuit is similar to that in the first embodiment and will be described for this embodiment with reference to FIGS. 5 and 12. The circuit includes a normally open switch 130 located on back panel 152 (FIG. 5) a short distance above the stack transfer point. Arm 131 on switch 130 is operated each cycle of stacker plate movement to close the switch in series with relay R1. A second switch in series with switch 130 is normally closed switch 132, which has not been shown in this embodiment but is located in such a manner as to be opened by receptacle 25 when the receptacle is in a stack receiving position. Switch 132 may be similar to that described in the first embodiment in FIGURE 1. If stack receptacle 25 is in the eject position, and undercarriage 154 approaches the transfer position, both switches 130 and 132 will be closed, causing relay R1 to be energized and open contact points *c* to interrupt the circuit of clutch CL. However, if the stack receptacle is in its proper transfer position, the closing of switch 130 by shaft 195 will have no effect since switch 132 will be open. As seen in FIG. 12, both switches must be closed at the same time to provide a circuit from ground through battery B, switch 132, switch 131, the coil of relay R1, and back to ground. When the relay is energized, document feeding is terminated so that the stacker plate will not be moved to the stack transfer position. Thus, as soon as a document stack has been removed from stack receptacle 25, the stack receptacle will return to its stack transfer postion and open switch 132, which will break the circuit to relay R1, permitting contacts *c* to close and reenergize the clutch to operate the document feeding mechanism.

It is contemplated that various interchanges of structural elements may be made between the first and second embodiments of the stack-forming devices above-described. For instance, the joggler may be adapted to control worm 28 (FIG. 1) of the first embodiment by providing a constantly rotating power source at the top of the stacking pocket and driving worm 28 from the top through a clutch. Alternatively, sensing switch 65 (FIG. 1) may be used to control an electromagnetic clutch substituted for the friction clutch shown in the second embodiment.

While the invention has been particularly shown and described with reference to preferred embodiments thereof, it will be understood by those skilled in the art that the foregoing and other changes in form and details may be made therein without departing from the spirit and scope of the invention.

I claim:

1. A device of the class described in which documents are deposited by a feeding mechanism, comprising, in combination: a document pocket including a stationary portion and a portion movable relative to said stationary portion, said portions cooperating to define walls of the pocket; forming means providing a movable end plate which is moved in response to the quantity of documents accumulating on the end plate; a support member for said movable portion tiltable from one position to a second position and resiliently biased in said one position; and means on said movable portion responsive to predetermined movement of said end plate for removing said documents from said plate to said movable portion causing said support member to tilt to said second position and carry said movable portion away from said stationary portion.

2. A device for automatically removing a stack of record documents from a stacking pocket in which the documents are being accumulated, comprising: in combination, a support means for said accumulating stack of documents having at least one opening therein and movable from a first position to a second position, adjusting means for moving said support means, control means constantly sensing the level of said stack for actuating said adjusting means to move said support means towards the second position from said first position as said documents accumulate, to maintain the level of said documents within predetermined limits, receiving means for an accumulated quantity of documents said receiving means including an intercepting member in alignment with and adapted to pass through said opening to intercept said accumulated documents as said support means reaches said second position, said receiving means being pivotally movable between an intercept position and an eject position, and resilient means restraining said receiving means in said intercept position, adapted to be overcome when said documents are intercepted by said intercepting member whereby the interception of said accumulated documents causes said receiving means to overcome the restraint thereon and move to said eject position.

3. A device for automatically forming and ejecting a stack of a predetermined quantity of record documents in a machine depositing said documents in a stacking pocket, each said document having a finite weight, comprising: variable support means in said pocket, movable from a first position to a second position as said documents accumulate thereon; adjusting means for said support means constantly sensing the level of said accumulating documents, for varying the location of said support means between said two positions to maintain the level of said accumulating documents between predetermined limits; a receptacle for receiving an accumulated stack of documents; pivotable base means on said pocket for said receptacle, including resilient supports, movable between a transfer position and an eject position in response to the weight of documents deposited in said receptacle, said base means being normally maintained in said transfer position; means for terminating said deposition of documents after a predetermined quantity has accumulated on said support means; and means for transferring said documents from said support means to said receptacle causing said base to move and carry said receptacle to said eject position in response to the weight of said documents.

4. A device for automatically forming a predetermined quantity of documents in a stacking pocket and ejecting said stack therefrom, said documents being deposited in said pocket by a feeding mechanism, comprising: support means in said pocket on which said documents are deposited to accumulate as a stack, said support means being movable between a first position and a second position; adjusting means to vary the location of said support means between said two positions; control means constantly sensing the level of said deposited documents and operative to actuate said adjusting means and maintain the level of documents between predetermined limits; a receptacle for receiving a document stack; a pivotable base means on said pocket for supporting said receptacle adjacent and parallel to said pocket in a transfer position and angularly displaced from said pocket in an eject position; resilient means urging said base means to support said receptacle in said transfer position and adapted to be overcome when said receptacle contains a stack of documents; and intercept means on said receptacle for intercepting said deposited documents and transferring said documents as a stack from said support means to said receptacle when said support means reaches its said second position.

5. The device as described in claim 4 further comprising means operated by said support means to terminate said deposition of documents in said stacking pocket as said support means reaches said second position; and means responsive to the absence of documents on said support means for returning said support means to said first position.

6. A device for automatically ejecting an accumulated stack of documents from a stacking pocket in which said documents are being deposited by a feeding mechanism, comprising document stacking means for said documents in said pocket, movable from a first position to a second position as said documents accumulate; a base means connected to said pocket movable from a transfer position to an eject position; an elongated receptacle on said base means for receiving a stack of documents, equal at least in length to the path of travel of said movable stacking means, and disposed parallel to said pocket when said base means is in said transfer position; resilient supporting means for maintaining said base means in said transfer position, adapted to be overcome when a document stack is contained in said receptacle to permit said base means to move to said eject position; and a transfer plate on said receptacle disposed transversely within said pocket for transferring said documents from said stacking means to said receptacle when said stacking means reaches said second position.

7. A device for ejecting a stack of record documents, containing a predetermined quantity of said documents, from a stacking pocket in which said documents are being deposited, said pocket having a document support therein movable according to the quantity of documents accumulated thereon, comprising: a receptacle for receiving a stack of documents: a pivot on said pocket; base means for said receptacle mounted on said pivot and movable in an arcuate path between a transfer position and an eject position, yieldable means for maintaining said base means in said transfer position adapted to be overcome by the weight of documents in said receptacle, and transfer means on said receptacle for transferring said document stack from said movable support to said receptacle when said movable support reaches a predetermined position and when said base means is in said transfer position, causing said base means to move to said eject position carrying said receptacle and said stack of documents.

8. A device for ejecting a predetermined quantity of record documents as a stack from a stacking pocket in which said documents are being deposited, said pocket having a support for said documents and being movable from the first position to a second position as said documents accumulate thereon, comprising: a receptacle for holding a stack of documents, a base member mounted for arcuate movement between a transfer position and an eject position, an element attached to said receptacle and adapted to move in said base member between one position and another position, yieldable means maintaining said element in said one position, adapted to be overcome when said base member is in said eject position and a stack of documents is in said receptacle, resilient means for maintaining said base member in said transfer position and adapted to be overcome when said receptacle contains a stack of documents, and transfer means on said receptacle disposed in the path of said movable support when said base member is in its said transfer position and when said element is in its said one position, for transferring said document stack from said support to said receptacle when said support reaches its said second position, whereby said base member is caused to move to its said eject position and said element is caused to move to said other position, carrying said stack from said support.

9. A device for ejecting a predetermined quantity of record documents as a stack from a stacking pocket in which said documents are being deposited, said pocket having therein a support for said documents movable from a first position to a second position as documents accumulate on said support, comprising a receptacle for holding a stack of documents, base means for said receptacle movable between a transfer position and an eject position, resilient means for maintaining said base means in said transfer position adapted to be overcome when said receptacle contains a document stack, means for retaining a document stack in said receptacle, movable from a stored position to a utile position, gripping means on said base means for moving said retaining means to said utile position when said base means is in its said eject position, and transfer means on said receptacle, disposed in the path of said movable support and said stack when said base means is in said transfer position, for transferring said stack from said support to said receptacle as said support reaches its said second position, whereby said base means carries said receptacle and said stack to said eject position and moves said retaining means to its said utile position.

10. A device for ejecting a stack of record documents from a stacking pocket in which said documents are being accumulated and for emptying said ejected documents from said device, said stacking pocket having therein a document support movable from a first position to a second position as said documents accumulate as a stack thereon, comprising; a recepatcle for holding a stack of record documents, a member mounted for movement between a transfer position and an eject position, a base element movable on said member between one position and another position and pivotally attached to said receptacle, yieldable means for maintaining said base element in said one position, adapted to permit said base element to move to said other position when said member is in said eject position and a stack of documents is in said receptacle, resilient means for maintaining said member in said transfer position and adapted to allow said member to move to said eject position when said receptacle contains a stack of documents, and transfer means on said receptacle, disposed in the path of said document support and said accumulated documents when said member is in said transfer position and said base element is in its said one position, for transferring said document stack from said support to said receptacle as said support reaches its said second position, causing said member to move to its said eject position and said base element to move to its said other position, whereby said receptacle may be pivoted about said base element for emptying said receptacle.

11. A device for forming a stack of record documents in a stacking pocket and ejecting said stack therefrom, said documents being individually deposited in said pocket by a feeding mechanism, comprising: a document support means variable between first and second positions along a fixed path and on which said deposited documents accumulate to generate a stack, movable adjusting means for varying the location of said support means from said first position to said second position, said adjusting means including an endless flexible member, one-way connective means on said support means engaging said flexible member, a rotary power source, a selectively operable clutch means for connecting said power source with said adjusting means, control means, including means for constantly sensing the level of said documents on said support means, for selevtively operating said clutch means to intermittently move said adjusting means and maintain the level of said stack within predetermined limits, a receptacle for receiving a stack of documents, resiliently supported receptacle base means for holding said receptacle in a stack-transfer position and adapted to move to a stack-eject position when said receptacle contains a document stack, transfer means on said receptacle, effective when said receptacle is in said transfer position and support means reaches its said second position to intercept said accumulated stack of documents and transfer said stack to said receptacle, causing said base means to move to said eject position.

12. A device as described in claim 11 further including means operable only after transfer of said document stack for returning said support means to said first position.

13. A device for forming a stack of record documents in a stacking pocket and removing said stack therefrom, said documents being deposited in said pocket by a feeding mechanism, comprising, in combination, a source of rotary power; a first adjusting means movable in a first direction; document support means in said pocket on which said documents accumulate, said support means being adjustable between a first position and a second position; connective means interconnecting said support means with said adjusting means for movement therewith; control means detecting the level of documents on said support means for intermittently coupling said first adjusting means with said power source, said control means including a shaft on said pocket, a first arm pivotally mounted on said shaft having a sensing portion thereon, a clutch for coupling said power source with said first adjusting means, disengaging means for said clutch so biased to disengage said clutch, a second arm supported on said first arm adjacent said disengaging means and operative to overcome said bias to engage said clutch, a cam rotated by said power source, a cam follower on said first arm operated by said cam to oscillate said first arm about said pivot and move said sensing portion into and out of said pocket, so that when said document stack is present said oscillating sensing portion is restricted causing said first arm to move said second arm to overcome said bias; receptacle means for receiving a stack of documents, movable from a transfer position to an eject position when a stack is contained therein; transfer means on said receptacle means disposed in the path of said document stack on said support means when said receptacle means is in said transfer position, operable at said second position of said support means to transfer said stack to said receptacle means, second adjusting means connected to said power source and moving in a second direction; and means on said support means responsive to the absence of said transferred document stack for engaging said adjusting means to return said stack toward said first position.

14. A device for increasing the capacity of a stacker pocket as documents are deposited therein and for reducing the capacity of said pocket when no documents are contained therein, comprising a source of rotary power, first adjusting means movable in a first direction, a movable document support means in said pocket adjustable between a first position and a second position, connective means engaging said support means with said first adjustable means for movement therewith towards said second position, control means detecting the level of said documents on said support means for intermittently coupling said power source with said first adjusting means to maintain the level of said documents within predetermined limits, second adjusting means moving constantly in a second direction, and frictional gripping means on said support means operable to engage said second adjustable means in response to the absence of documents on said support means, to move said support means towards said first position.

15. A device for varying the position of a document support in a stacking pocket according to the quantity of documents contained therein, comprising a rotary power source, first adjusting means movable in a first direction, said adjusting means including a first rotatable endless flexible member, positionable document support means adjustable between a first position and a second position, one-way connective means engaging said support means with said flexible member for movement therewith towards said second position, control means detecting the level of said documents on said support means for intermittently coupling said power source with said first adjusting means for rotation in said first direction to maintain the level of said documents within predetermined limits, second adjusting means engaged with said power source and moving in a second direction, including a second rotatable endless flexible member, and means responsive to the absence of documents on said support means for frictionally engaging said second adjusting means to move said support means towards said first position.

16. A device for automatically removing a quantity of record documents from a stacking pocket in which said documents are being deposited, each said document having a finite weight, comprising, in combination:

a support means in said pocket on which said deposited documents accumulate;

said support means having an opening therein and movable from a first position to a second position;
receptacle means in said pocket having a transfer member thereon in alignment with said opening in said first support and adapted to pass therethrough as said support means enters its said second position, said documents thereby being transferred to said transfer member, said receptacle means being pivotally movable from a transfer position to an eject position;
resilient means restraining said receptacle means in said transfer position, said resilient means being strong enough to support the receptacle in said transfer position when said documents are on said support means and adapted to be overcome when the weight of said documents is transferred to said transfer member;
control means for causing said first support means to move from said first position towards said second position as said documents accumulate on said first support means, whereby the weight of said documents is transferred to said transfer member as said first support means enters its second position, so that the force of said resilient restraining means is overcome and said receptacle means pivotally moves to said eject position.

17. A device for automatically forming a stack of record documents in a stacking pocket and ejecting said stack therefrom, said documents being deposited in said pocket by a feeding mechanism, comprising:
a support means in said pocket on which said documents are deposited, movable between a first position and a second position;
an intermittently actuatable worm mechanism for varying the location of said support means within said pocket between said two positions;
control means including a pivotally mounted member constantly sensing the level of accumulated documents on said support means for intermittently actuating said worm mechanism to vary the location of said support means;
a receptacle means including a base means pivotally mounted in said pocket for angular movement relative to said pocket between a transfer position and an eject position;
a transfer member connected to said base means, said transfer member disposed transversely within said pocket when said receptacle is in said transfer position for intercepting said accumulated documents as said support means enters its said second position;
resilient means restraining said receptacle means in said transfer position, said resilient means being strong enough to support the receptacle in said transfer position when said documents are on said support means and adapted to be overcome when the weight of said documents is transferred to said transfer member thereby allowing said receptacle means to move to said eject position as said support means enters said second position.

18. A device for forming a stack of record documents in a stacking pocket and removing said stack therefrom, said documents being deposited in said pocket by a feeding mechanism, comprising:
a support means in said pocket having at least one opening therein and movable between a first position and a second position as said documents accumulate as a stack thereon;
said support means having an engaging element attached thereto;
a power source;
means for adjusting said support between said two positions including a movable endless flexible member engageable with said element;
control means, including sensing means to sense the level of said stack on said support means, for intermittently connecting said power source with said adjusting means to move said endless flexible member so as to maintain the level of said stack within predetermined limits;
receptacle means for said accumulating stack movable from a transfer position to an eject position when a stack is placed thereon;
a transfer member in said receptacle disposed in the path of said opening in said support for transferring said accumulated stack to said receptacle means when said support reaches said second position;
and resilient means restraining said receptacle means in said transfer position, said resilient means being strong enough to support the receptacle in said transfer position when said documents are on said support means and adapted to be overcome when the weight of said documents is transferred to said transfer member, thereby allowing said receptacle means to move to said eject position as said support means enters said second position.

19. A device for forming a stack of record documents in a stacking pocket and removing said stack from said pocket, said documents being deposited in said pocket by a feeding mechanism, comprising:
a support means in said pocket having at least one opening therein and on which said docuuments accumulate as a stack and adapted to move in a fixed path between a first and second position;
an endless flexible member mounted for rotation;
driving means for said endless flexible member;
engaging means connecting said support with said endless flexible member;
a rotary power source;
clutch means operable for engaging said power source with said driving means;
control means, including detecting means to detect the level of said accumulating stack, for intermittently operating said clutch means to rotate said endless flexible member and move said support means toward said second position to maintain said stack level within predetermined limits.
receptacle means for said stack movable between a transfer position and an eject position when a stack of documents is contained therein;
a transfer member attached to said receptacle means and disposed in the path of said opening in said support means when said receptacle means is in said transfer position, for transferring the stack from said support means to said transfer member and therefore said receptacle means as said support means reaches its said second position;
and resilient means restraining said receptacle means in said transfer position, said resilient means being strong enough to support the receptacle in said transfer position when said documents are on said support and adapted to be overcome when the weight of said documents is transferred to said transfer member, thereby allowing said receptacle means to move to said eject position as said support means enters said second position.

20. A device for automatically forming a stack of documents in a stacking pocket and removing said stack therefrom, said documents being deposited in said pocket by a feeding mechanism, comprising:
a source of rotary power;
first adjusting means movable in a first direction, toward a second position;
document support means in said pocket having at least one opening therein and on which said documents accumulate as a stack, said support means being adjustable between a first position and said second position;
connective means interconnecting said support means with said first adjusting means for movement therewith;

control means, including means for dynamically detecting the level of documents on said support means, for intermittently coupling said first adjusting means with said power source to maintain the level of said documents within predetermined limits;

receptacle means for receiving a stack of documents, movable from a transfer position to an eject position when said stack is contained therein;

transfer means on said receptacle means disposed in the path of said opening in said support means and thereby said document stack when said receptacle means is in said transfer position and operable at said second position of said support means to transfer said stack to said receptacle means;

resilient means restraining said receptacle means in said transfer position, said resilient means being strong enough to support the receptacle in said transfer position when said documents are on said support and adapted to be overcome when the weight of said documents is transferred to said receptacle means, thereby allowing said receptacle means to move to said eject position as said support means enters said second position;

second adjusting means connected to said power source and moving in a second direction;

and means on said support means responsive to the absence of said document stack for engaging said second adjusting means to return said support means toward said first position, whereby said support means is returned to said first position when said stack is transferred to said receptacle means.

References Cited in the file of this patent

UNITED STATES PATENTS

| | | |
|---|---|---|
| 2,205,767 | Lamb | June 25, 1940 |
| 2,579,541 | Bobst | Dec. 25, 1951 |
| 2,645,476 | Wood et al. | July 14, 1953 |
| 2,668,626 | Stuioenberg | Feb. 9, 1954 |